(12) United States Patent
Garman et al.

(10) Patent No.: US 10,972,489 B2
(45) Date of Patent: *Apr. 6, 2021

(54) CYBERSECURITY INCIDENT DETECTION SYSTEMS AND TECHNIQUES

(71) Applicant: Carbon Black, Inc., Waltham, MA (US)

(72) Inventors: Jason A. Garman, Ashburn, VA (US); Benjamin Johnson, Newport Beach, CA (US); Jason J. McFarland, Fair Oaks Ranch, TX (US)

(73) Assignee: Carbon Black, Inc., Waltham, MA (US)

( * ) Notice: Subject to any disclaimer, the term of this patent is extended or adjusted under 35 U.S.C. 154(b) by 173 days.

This patent is subject to a terminal disclaimer.

(21) Appl. No.: 15/704,676

(22) Filed: Sep. 14, 2017

(65) Prior Publication Data

US 2018/0077187 A1 Mar. 15, 2018

Related U.S. Application Data

(60) Provisional application No. 62/394,420, filed on Sep. 14, 2016.

(51) Int. Cl.
*H04L 29/06* (2006.01)
*G06F 16/951* (2019.01)
(Continued)

(52) U.S. Cl.
CPC ........ *H04L 63/1425* (2013.01); *G06F 16/951* (2019.01); *G06F 21/552* (2013.01);
(Continued)

(58) Field of Classification Search
CPC ......... H04L 63/14; G06F 16/95; G06F 21/55; G06N 5/02
See application file for complete search history.

(56) References Cited

U.S. PATENT DOCUMENTS 9,215,244 B2 12/2015 Ayyagari et al.
9,256,730 B2 2/2016 Wicherski
(Continued)

FOREIGN PATENT DOCUMENTS

EP 1887754 A1 2/2008
WO WO-2016037024 A1 3/2016

OTHER PUBLICATIONS

U.S. Appl. No. 15/468,942, Systems and Techniques for Guiding a Response to a Cybersecurity Incident, filed Mar. 24, 2017.
(Continued)

*Primary Examiner* — Wasika Nipa

(57) ABSTRACT

Behavioral baselines for a computer system may be accurately and efficiently established by (1) monitoring occurrences on the computer system, (2) determining, based on security rules or heuristics, which of the observed occurrences are associated with potential security risks, (3) identifying patterns of activity based on the suspicious occurrences, and (4) prompting a user to indicate whether the observed patterns of suspicious activity are expected or unexpected. Behavior baselines established in this manner can then be used to differentiate between expected and unexpected patterns of activity on the computer system.

22 Claims, 2 Drawing Sheets

(51) Int. Cl.
*G06F 21/56* (2013.01)
*G06F 21/55* (2013.01)
*G06N 5/02* (2006.01)

(52) U.S. Cl.
CPC ............ *G06F 21/566* (2013.01); *G06N 5/02* (2013.01); *H04L 63/1441* (2013.01); *H04L 63/1416* (2013.01)

(56) References Cited

U.S. PATENT DOCUMENTS

| | | |
|---|---|---|
| 9,258,321 B2 | 2/2016 | Amsler et al. |
| 2009/0293121 A1 | 11/2009 | Bigus et al. |
| 2013/0305357 A1* | 11/2013 | Ayyagari ............. H04W 12/06 726/22 |
| 2014/0165140 A1* | 6/2014 | Singla ................... G06F 21/554 726/1 |
| 2015/0106927 A1* | 4/2015 | Ferragut ............ H04L 63/1408 726/23 |
| 2015/0356301 A1 | 12/2015 | Diehl et al. |
| 2016/0021056 A1 | 1/2016 | Chesla |
| 2016/0028759 A1* | 1/2016 | Visbal ................. H04L 63/1441 726/22 |
| 2016/0072836 A1 | 3/2016 | Hadden et al. |

OTHER PUBLICATIONS

Azmandian et al., "Virtual machine monitor-based lightweight intrusion detection", ACM SIGOPS Operating Systems Review, Jul. 18, 2011, 16 pages, vol. 45, No. 2.

* cited by examiner

CYBERSECURITY INCIDENT DETECTION SYSTEMS AND TECHNIQUES

CROSS-REFERENCE TO RELATED APPLICATION(S)

This application claims priority to and the benefit of U.S. Provisional Patent Application Ser. No. 62/394,420, filed on Sep. 14, 2016, which is hereby incorporated by reference herein in its entirety.

FIELD OF INVENTION

The present disclosure relates generally to cybersecurity systems and techniques. In particular, some embodiments relate to enhancing the performance of cybersecurity systems and techniques by distinguishing expected activity on a computer system from unexpected activity.

BACKGROUND

As the Internet and other networked computer systems become increasingly integrated into public activities (e.g., management and operation of governmental organizations) and private activities (e.g., personal activities, management and operation of households and businesses, etc.), malicious software ("malware") poses an increasingly significant threat to such pursuits. Malware generally operates to disrupt operation of computer systems (e.g., by taking control of computational resources and using those resources for unauthorized purposes, by disabling individual computers or entire networks, by damaging or otherwise sabotaging system components, etc.) and/or to steal resources from computer systems (e.g., by gathering sensitive data). Malware can be deployed in many forms, including computer viruses, worms, trojan horses, ransomware, spyware, adware, scareware, keystroke loggers, rootkits, bots, crimeware, phishing scams, etc.

Public and private entities devote significant resources to detecting malware and preventing malware from disrupting the operations of their computer systems or stealing their computer-based resources. Conventional cybersecurity engines have relied extensively on static, signature-based techniques for detecting malware. In general, static, signature-based malware detection involves obtaining a copy of a file that is known to contain malware, analyzing the static features of the file (e.g., the sequence of bytes contained in the file) to extract a static signature that is characteristic of the malware, and adding the malware's static signature to a database (often referred to as a "blacklist") of known malware. When a user attempts to access (e.g., download, open, or execute) a file, the cybersecurity engine scans the file and extracts the file's static signature. If the file's static signature matches a signature on the blacklist, the cybersecurity engine detects the presence of malware and intervenes to prevent the malware from executing (e.g., by quarantining or deleting the file).

Static, signature-based malware detection techniques are generally useful for quickly detecting known malware. However, these techniques can generally be circumvented by new malware that is not yet blacklisted (e.g., zero-day malware or next-generation malware) or by malware that modifies itself to avoid matching a static signature on the blacklist (e.g., oligomorphic, polymorphic, or metamorphic malware).

Some cybersecurity engines rely on behavior-based techniques for detecting malware and other security problems. In general, behavior-based security techniques involve monitoring activity on a computer system, identifying suspicious activity, and when suspicious activity is identified, intervening to assess the problem (e.g., by initiating a forensic investigation of the activity, etc.) and/or to protect the computer system (e.g., by quarantining system resources associated with the activity).

SUMMARY OF THE INVENTION

One problem associated with behavior-based incident detection and prevention relates to a tradeoff between false negative outcomes (e.g., erroneously classifying malicious activity as benign) and false positive outcomes (e.g., erroneously classifying benign activity as malicious). An incident detection engine that produces too many false negative outcomes may fail to detect malicious behavior, rendering the detection engine ineffective and exposing the computer system to malicious attacks. On the other hand, an incident detection engine that produces too many false positive outcomes may identify legitimate activity as suspicious and initiate unnecessary interventions (e.g., forensic investigations) that disrupt the legitimate activities of a user or an organization. Initiating unnecessary interventions also wastes resources, including computing resources (e.g., computing time, storage, etc.), energy resources (e.g., electrical power), human resources (e.g., the time and attention of security experts), and others. Furthermore, in addition to triggering forensic investigations that waste significant resources, a high rate of false positive alerts can also make it harder to identify actual attacks, by burying the proverbial needle (evidence of an actual attack) in a proverbial haystack (legitimate activity erroneously flagged as potential threats).

The above-described tradeoff between false positive and false negative outcomes can be mitigated, to some extent, by configuring an incident detection engine to differentiate between expected and unexpected patterns of certain types of activity, rather than simply issuing security alerts for all instances of these types of activity. For example, if a particular user (or each user in a particular class of users) generally logs on to a computer system's secure servers up to five times per day for legitimate purposes, an incident detection engine monitoring access to the secure servers can be configured to treat such a user's log-ins as benign when the user logs in to the servers five or fewer times per day (an expected pattern of activity), but as potentially malicious when the user logs on to the servers more than five times in a given day (an unexpected pattern of activity), rather than issuing security alerts whenever the user logs in to the server or never issuing a security alert no matter how often the user logs in to the server.

As another example, execution of web browser plug-ins may generally be regarded as suspicious because various web browser plug-ins have frequently been used for malicious purposes in the past. However, an organization may install a particular set of non-malicious plug-ins on its computers to enhance the productivity of a particular group of users. For such a computer system, the incident detection engine may recognize the execution of the authorized set of plug-ins by the authorized group of users as expected and therefore not suspicious—even if the engine would consider the execution of the same plug-ins as suspicious in another context—thereby reducing the engine's rate of false positive outcomes. However, the incident detection may continue to recognize (1) the execution of any plug-ins other than the authorized plug-ins as unexpected and therefore suspicious, and (2) the execution of the authorized plug-ins by any users other than the authorized group of users as unexpected and therefore suspicious, thereby not increasing the engine's rate of false negative outcomes.

The process of configuring an incident detection engine to distinguish expected activity (e.g., of a particular user or group of users on a particular computer system or portion thereof) and unexpected activity may be referred to herein as "establishing a behavioral baseline," "establishing a baseline," "behavioral baselining," or simply "baselining". In general, behavioral baselining can improve the flexibility of incident detection engines by customizing the incident detection rules to the different activities and requirements of different users (e.g., individual users, groups of users, classes of users, etc.) and computer systems. Activity that may be suspicious in one part of an organization may be legitimate in another part of the organization or in a different organization, and vice versa. As described above, the use of an accurate behavioral baseline to distinguish expected activity from unexpected activity can reduce an incident detection engine's rate of false positive outcomes, thereby conserving resources and making it easier for forensic investigators to identify actual attacks.

On the other hand, the use of an inaccurate behavioral baseline can increase an incident detection engine's rate of false negative outcomes, thereby exposing the computer system to additional risk. However, conventional techniques for obtaining a behavioral baseline can be inefficient (e.g., can require substantial computing and human resources) and inaccurate (e.g., the baseline can fail to identify benign, expected activity as such, or can misidentify malicious, unexpected activity as benign). Thus, there is a need for accurate and efficient techniques for establishing a behavioral baseline (e.g., of a particular user or group of users on a particular computer system or portion thereof).

The inventors have recognized and appreciated that behavioral baselines for a computer system can be accurately and efficiently established by (1) monitoring occurrences on the computer system (e.g., particular occurrences, particular types of occurrences, etc.), (2) determining, based on security rules or heuristics, which of the observed occurrences are associated with potential security risks, (3) identifying, based on the observed occurrences, patterns of activity (e.g., activity involving access to particular resources or types of resources; activity initiated by particular users, groups of users, or classes of users; etc.), and (4) prompting a user (e.g., a computer system administrator, forensic investigator, etc.) to indicate whether the observed patterns of activity associated with potential security risks are expected or unexpected. Behavior baselines established in this manner can then be used to differentiate between expected and unexpected patterns of activity on the computer system for which the baselines were established.

In general, one innovative aspect of the subject matter described in this specification can be embodied in a computer-implemented cybersecurity method, including: obtaining first occurrence data indicative of a plurality of first occurrences observed in a computer system, wherein the first occurrence data indicate respective first types of the first occurrences; and identifying, based on the first occurrence data, a plurality of first patterns of activity in the computer system. The method further includes, for each of the identified first patterns of activity: prompting a user of the computer system to indicate whether the respective pattern of activity is expected; in response to prompting the user, receiving user input; determining, based on the user input, whether the respective pattern of activity is expected; and if the user input indicates that the respective pattern of activity is expected, adding data representing the respective pattern of activity to a behavioral baseline database. The method further includes: obtaining second occurrence data indicative of a plurality of second occurrences observed in the computer system, wherein the second occurrence data indicate respective second types of the second occurrences; identifying, based on the second occurrence data, at least one second pattern of activity in the computer system; and determining whether to issue a security alert related to the second pattern of activity based, at least in part, on whether the behavioral baseline database indicates that the second pattern of activity is expected.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The first occurrence data may be obtained based on security data indicating that occurrences of the first types are relevant to computer security and/or that changes in patterns of occurrences of the first types are relevant to security, and the second occurrence data may be obtained based on security data indicating that occurrences of the second types are relevant to computer security and/or that changes in patterns of occurrences of the second types are relevant to computer security. The first occurrence data may be obtained based on security data indicating that one or more suspicious patterns of activity include one or more occurrences of the first types. The second occurrence data may be obtained based on security data indicating that one or more suspicious patterns of activity include one or more occurrences of the second types.

Identifying the first patterns of activity may include identifying a set of one or more occurrences involving (1) a particular set of one or more users, (2) a particular set of one or more resources, and/or (3) a particular set of one or more devices. The particular set of one or more users may include a particular user, a plurality of specified users, or users of a specified type. The particular set of one or more resources may include a particular resource, a plurality of specified resources, or resources of a specified type. The particular set of one or more devices may include a particular device, a plurality of specified devices, or devices of a specified type. The occurrences in the set of one or more occurrences may include module-loading operations, file operations, registry operations, inter-process operations, and/or inter-device communication operations.

The first patterns of activity may include a temporal pattern of activity and/or a quantitative pattern of activity. Identifying the temporal pattern of activity may include determining a temporal rate of the occurrences in the identified set of occurrences. Identifying the quantitative pattern of activity may include determining a number of the occurrences in the identified set of occurrences. The occurrences in the identified set of occurrences may occur in a specified time period. The specified time period may include a fixed time period or a sliding window time period.

Determining whether to issue the security alert related to the second pattern of activity may include identifying one or more attributes of the activity associated with the second pattern of activity; and querying the behavioral baseline database for an expected pattern of activity having the identified attributes. Determining whether to issue the security alert related to the second pattern of activity may further include: in response to querying the behavioral baseline database, obtaining data indicative of the expected pattern of activity having the identified attributes; and determining whether the second pattern of activity is consistent with the expected pattern of activity. Determining whether to issue the security alert related to the second pattern of activity may further include: in response to determining that the second pattern of activity is consistent with the expected pattern of activity, determining not to issue the security alert related to the second pattern activity. Determining whether to issue the security alert related to the second pattern of activity may further include: in response to determining that the second pattern of activity is inconsistent with the expected pattern of activity, determining to issue the security alert related to the second pattern activity. Determining whether to issue the security alert related to the second pattern of activity may further include: in response to querying the behavioral baseline database, failing to obtain data indicative of the expected pattern of activity having the identified attributes; and based on absence of data indicative of the expected pattern of activity having the identified attributes, determining to issue the security alert related to the second pattern of activity.

The actions of the method may include, for a particular first pattern of activity: identifying one or more attributes of the activity associated with the particular first pattern of activity; prompting a user of the computer system to indicate whether additional activity having the one or more attributes is expected; in response to prompting the user, receiving second user input indicating that additional activity having the one or more attributes is expected and characterizing the additional activity; generating data representing a corrected pattern of activity based on the particular first pattern of activity and the additional activity; and adding data representing the corrected pattern of activity to the behavioral baseline database.

The actions of the method may include: prompting a user of the computer system to indicate whether the second pattern of activity is expected; in response to prompting the user, receiving second user input; determining, based on the second user input, whether the second pattern of activity is expected; and if the second user input indicates that the second pattern of activity is expected, adding data representing the second pattern of activity to a behavioral baseline database.

The first patterns of activity may include a rate at which a particular user performs a particular type of activity. The particular type of activity may include loading a particular module, performing a file operation, performing a registry operation, performing an inter-process operation, or communicating with a particular remote device or domain. The first patterns of activity may include a rate at which a particular group of users performs a particular type of activity. The first patterns of activity may include a rate at which a particular resource of the computer system is accessed. The particular resource may be a server, a database, a file, a communication port, or a power supply.

The data representing the respective pattern of activity may include data indicating a type of the pattern. The type of the pattern may be temporal. The data representing the respective pattern of activity may include data indicating the type of the activity to which the pattern pertains. The type of the activity may include loading a module, performing a file operation, performing a registry operation, performing an inter-process operation, or communicating with a remote device or domain. The data representing the respective pattern of activity may include data indicating a rate at which the activity is performed. The data representing the respective pattern of activity may include data identifying one or more users of whom the respective pattern of activity is expected. The respective pattern of activity may represent a pattern of activity involving a particular resource of the computer system, and the data representing the respective pattern of activity may include data identifying the particular resource.

Some embodiments of the techniques described herein may exhibit certain advantages over conventional cybersecurity systems and techniques. For example, by focusing the requests for user feedback on observed patterns of activity associated with potential security risks, the above-described techniques can efficiently establish accurate behavioral baselines. Using accurate behavioral baselines established in accordance with the above-described techniques can reduce an incident detection engine's rate of false positive outcomes, thereby conserving resources and making it easier for forensic investigators to identify actual attacks.

In some embodiments, the rules identifying patterns of activity associated with potential security problems may be defined in terms of (1) particular groups or types of users, (2) particular groups or types of resources, and/or (3) particular groups or types of devices. Defining suspicious activity in terms of patterns of activity involving specified types and groups of users, resources, and devices, may be an elegant and efficient technique for establishing general security rules that are broadly applicable to a wide variety of computer systems. In some embodiments, such generally applicable rules may be customized to accommodate the peculiarities of a particular computer system by identifying expected patterns of suspicious types of activity (e.g., patterns of activity that are generally considered to be suspicious, but are expected on a particular computer system), thereby defining system-specific exceptions to general definitions of suspicious activity.

The foregoing summary, including the description of motivations for some embodiments and/or advantages of some embodiments, is intended to assist the reader in understanding the present disclosure, and is not intended to limit the scope of the claims in any way. Other aspects and/or advantages of some embodiments will become apparent from the following drawings, detailed description, and claims, all of which illustrate the principles of the invention, by way of example only.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Terms

Figure 1:
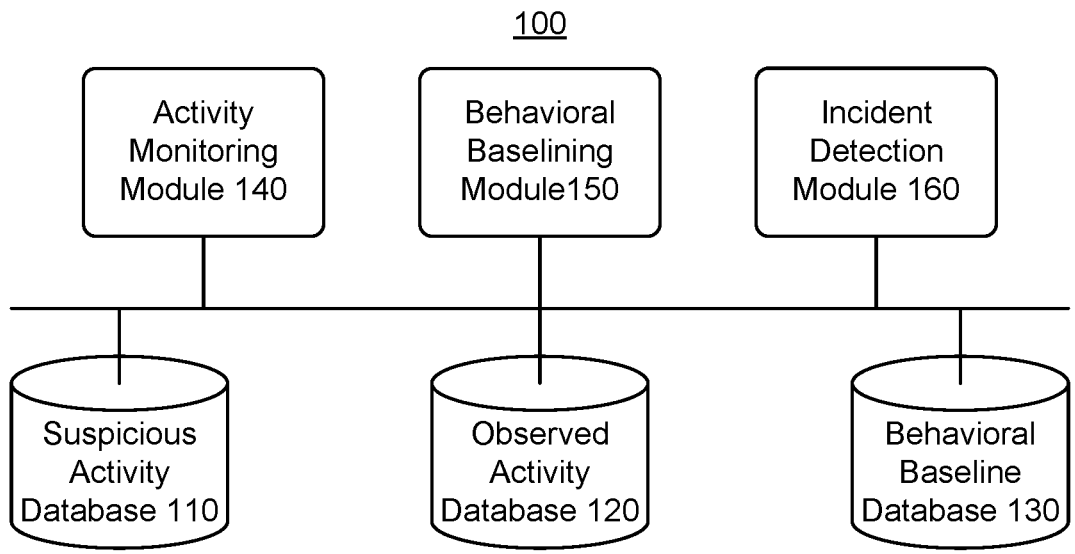
FIG. 1 is a block diagram of cybersecurity incident detection engine, in accordance with some embodiments.

The term "computer system," as used herein, may include one or more computers and/or computer networks (e.g., a plurality of computers and one or more networks communicatively coupling those computers).

The term "security problem," as used herein, may include an actual or suspected threat to or breach of the security of a computer system.

The term "occurrence," as used herein, may include any operation performed by a computer system, activity observed on a computer system, etc. Some examples of occurrences may include loading a particular file (e.g., a particular binary file), executing a particular process, executing a particular application, accessing an address in a particular range of addresses in a memory space, accessing a particular registry entry in an operating system's registry, accessing a particular peripheral device of the computer system, communicating with a particular device (or a device at a particular address, or device(s) within a particular domain), accessing a particular path in a file directory, etc.

The term "pattern of activity," as used herein, may include any type of pattern of any type of activity (e.g., occurrence) observed in a computer system, for example, a temporal pattern of a particular activity or type of activity (e.g., a date, day of the week, day, time, or time period associated with a particular occurrence), a quantitative pattern of a particular type of activity (e.g., the rate at which a particular operation or type of operation is performed, the frequency with which a particular resource or type of resource is accessed, the rate or frequency of a particular occurrence or type of activity, etc.), a sequential pattern of activity (e.g., a sequence in which particular operations or types of operations are performed, a sequence in which particular resources or types of resources are accessed, a sequence of particular occurrences or types of activities, etc.), a user's pattern of activity (e.g., the frequency with which a user performs a particular type of activity, the frequency of a particular occurrence involving the user), a group's pattern of activity (e.g., the rate at which members of a group perform a particular type of activity or access a particular resource, the rate of a particular occurrence involving members of the group), a pattern of activity involving a particular device (e.g., network-connected device) or type of device, etc. With respect to quantitative patterns of activity, a rate or frequency of an activity or type of activity may be measured with respect to a fixed time period (e.g., a week, a day, etc.) or a sliding time window (e.g., a sliding 30-minute period, a sliding one-hour period, etc.).

A pattern of activity may characterize activity (e.g., occurrences or types of activity) involving (e.g., initiated by) a particular user or group of users, activity involving (e.g., using) a particular resource (e.g., process, application, file, registry entry, peripheral device, path in a file directory, memory address, etc.) or type of resource (e.g., type of process or group of processes, type of application or group of applications, type of file or group of files, type of registry entry or group of registry entries, type of peripheral device or group of peripheral devices, type of path in a file directory or group of paths in a file directory, range or group of memory addresses, type of network address or group of network addresses, etc.), activity involving (e.g., accessing, using, or communicating with) a particular device (e.g., a device at a particular network address), group of devices, or type of device, etc.

Some examples of types of files may include command shells (e.g., cmd.exe, bash, sh, csh, powershell.exe, etc.), executable files, documents, archives, plain text files, etc. Some examples of groups of files may include documents, archives, plain text files, user-specified groups of files, etc.

Some examples of types of processes may include login processes (e.g., processes that run when a user logs into a computer system or account), logout processes (e.g., processes that run when a user logs out of a computer system or account), system administrative processes including but not limited to dual-use system administration processes (e.g., psexec, sysinternals tools, etc.), interpreters including but not limited to interactive and/or script interpreters (e.g., python, perl, etc.), etc. Some examples of groups of processes may include user-specified groups of processes, processes having familial relationships with each other in a process execution tree (e.g., parent, child(ren), sibling(s), etc.).

Some examples of types of applications may include web browsers (e.g., Safari, Firefox, Chrome, Internet Explorer, Microsoft Edge, etc.), office applications (e.g., Microsoft Word, Microsoft Excel, Microsoft PowerPoint, Microsoft Outlook, OpenOffice, etc.), software development tools (e.g., compilers, Visual Studio, Integrated Development Environments (IDEs), etc.), web browser plugins, etc. Some examples of types of paths may include paths to system folders (e.g., C:\Windows, C:\Windows\system32, etc.), paths to user home directories (e.g., C:\Users for Windows, /home for Linux, /Users for Mac OS X, etc.), etc.

Some examples of types of network addresses may include network addresses (e.g., ranges of Internet Protocol ("IP") addresses) of particular organizational local area networks (LANs) (e.g., corporate LANs; the LAN(s) of the organization that owns, operates, or uses the computer system in which the pattern of activity was observed; the LAN(s) of other organizations, etc.), network addresses of an organization's demilitarized zone ("DMZ") or perimeter network, network addresses of an organization's remote access points (e.g., virtual private network ("VPN") concentrators, Citrix access points, etc.), etc.

Some examples of groups or types of users may include remote users (e.g., users who are remotely logged into a computer system), executive users (e.g., users who hold executive positions within an organization), sales users (e.g., users who hold sales positions within an organization), office workers (e.g., users who work in an office within an organization), developers (e.g., users who develop software for an organization), etc.

Some examples of types of devices may include sensitive devices (e.g., a set of devices identified by an administrator as storing or having access to sensitive data, or otherwise having sensitive status with respect to cybersecurity matters), executive workstations (e.g., desktop computers or other workstations used by executive users), executive laptops (e.g., laptop computer or other mobile devices used by executive users), devices in particular network domains, developer workstations (e.g., desktop computers or other workstations used by software developers), other high-value targets, etc.

Some examples of groups of paths may include user-specified groups of paths, paths having familial relationships with each other in a file directory, etc.

The term "security event" or "event," as used herein, may include any occurrence or pattern of activity in a computer system that has been determined to be malicious (e.g., to indicate the existence of an actual security problem) or suspicious (e.g., to indicate the existence of a potential security problem). The determination that an occurrence or pattern of activity is malicious or suspicious may be made manually (e.g., by a user of the computer system) or automatically (e.g., by a component of the computer system or a device in communication with the computer system), using any suitable techniques. Some examples of types of events may include, without limitation, a system crash, a packet flood, unauthorized use of system privileges, unauthorized access to data, a denial of service attack, unauthorized modification of software, a policy violation, a virus infection, execution of malware, a change in the state of a file or system component, the presence of an entry in a log (e.g., a firewall log), the presence of a file (e.g., a binary file) in a storage medium of the computer system, etc.

The term "security incident" or "incident," as used herein, may include a set of one or more security events that have been determined to be actually or potentially related (e.g., actually or potentially related to the same security problem). The determination that a security event is actually or potentially related to a particular security problem may be made manually (e.g., by a user of the computer system) or automatically (e.g., by a component of the computer system or a device in communication with the computer system), using any suitable techniques.

The term "incident response," as used herein, may include any actions or operations performed based, at least in part, on the detection of a security incident and/or a security event. Incident response actions or operations may include, without limitation, initiating a forensic investigation of a security event and/or incident, investigating a security event and/or security incident, mitigating the harm caused by a security event and/or incident, etc.

An investigation of a security event may include any activities that facilitate a determination as to whether the security event is related to a security problem, identification of a root cause of the security event, a determination of the scope of the security event, etc.

In cases where a security event involves access to data, investigating the security event may include identifying the accessed data, determining whether the accessed data were modified, deleted, copied, or transmitted, determining whether the accessed data were valuable or confidential, determining which user account was used to access the data, etc.

In cases where a security event involves communication over a network, investigating the security event may include determining which network resources (e.g., network ports, network interfaces, etc.) were accessed, determining the address (e.g., Internet Protocol (IP) address) of the remote device that communicated with the computer system via the network, determining whether the address of the remote device is known to be associated with malicious or suspicious activity, etc.

An investigation of a security event may include determining which process performed the act(s) that caused the security event, determining whether the process is a known malware process, determining which user initiated execution of the process, etc.

An investigation of a security event may include determining which binary file was executed to initiate the process that caused the security event, determining whether the binary file is a known malware file, determining which user loaded the binary file onto the computer system, determining how was the binary file was loaded onto the computer system, etc.

An investigation of a security incident may include investigations of one or more security events that are part of the security incident, and/or any activities that facilitate identification of a root cause of the security incident, determination of the scope of the security incident, determination of the risk or threat posed by the security incident, etc.

Mitigating the harm caused by a security event and/or incident may include quarantining malicious or suspicious files or processes, disconnecting one or more computers from a computer network, disabling or deactivating portions of the computer system, etc.

A System for Guiding Incident Response

FIG. 1 shows a cybersecurity incident detection engine 100, in accordance with some embodiments. In operation, the incident detection engine 100 may establish behavioral baselines for the computer system, its resources, and/or its users. In addition, the incident detection engine 100 may use the behavioral baselines to detect security events or incidents in a computer system, and initiate incident response actions or operations in response thereto. In some embodiments, the incident detection engine 100 includes one or more software components (e.g., activity monitoring module 140, behavioral baselining module 150, incident detection module 160, etc.) and one or more databases (e.g., suspicious activity database 110, observed activity database 120, behavioral baseline database 130, etc.). Each of the software components 140-160 and databases 110-130 is described in further detail below.

In some embodiments, the suspicious activity database 110 stores data indicative of suspicious activity (e.g., data identifying types or patterns of activity that are associated with the existence of a security problem) and/or security data indicative of types of activity that are relevant (or potentially relevant) to computer security. For example, the suspicious activity database 110 may contain data indicating the extent to which the following types of activity are associated with (e.g., correlated with) security problems:

(1) Loading a Particular Module or Type of Module.

There may be an association between the existence of a security problem and the act of loading a particular module or type of module. Loading a module may include copying the contents of the module (or a portion thereof) into the address space of a process, invoking the module (or a function thereof), executing the module (or a portion thereof), etc. Some examples of modules include, without limitation, library modules (e.g., .DLLs), executable modules (e.g., .EXEs), kernel modules, binary files, plug-ins, etc. The suspicious activity database 110 may store security data characterizing modules or types of modules associated with security problems. Such data may include data identifying the path to a module, data identifying a module (e.g., an MD5 hash value for the module), etc.

(2) Performing a Particular File Operation or Type of File Operation.

There may be an association between the existence of a security problem and the act of performing particular file operations or types of file operations. File operations include operations performed on files, operations that access the file system of a computing device, etc. Some examples of file operations include creating a file, deleting a file, renaming a file, changing the attributes of a file, changing the access permissions of a file, opening a file, closing a file, reading data from a file, writing data to a file, etc. The suspicious activity database 110 may store security data characterizing file operations associated with security problems.

(3) Performing a Particular Registry Operation or Type of Registry Operation.

There may be an association between the existence of a security problem and the act of performing particular registry operations or types of registry operations. In general, an operating system (OS) registry may store values ("registry key values") of settings ("registry keys") for an OS kernel, other portions of an operating system, device drivers, services, and/or applications. An executing process with appropriate permissions may perform operations on one or more registry keys. Some examples of registry operations include reading the value of a registry key, writing the value of a registry key, creating a registry key, deleting a registry key, etc. The suspicious activity database 110 may store security data characterizing registry operations associated with security problems. Such security data may include data identifying registry keys (e.g., names or pathnames of registry keys), data indicating registry key values, data identifying the type of operation performed on a registry key (e.g., read, write, read/write), etc.

(4) Performing an Inter-Process Operation.

There may be an association between the existence of a security problem and the act of performing an inter-process operation. An inter-process operation occurs when a process (the "source process") performs an operation that crosses a security boundary of another process (the "target process"). Some examples of inter-process operations include opening a handle to another process, opening a handle to a thread of another process, creating a thread within another process, spawning a child process, etc. The suspicious activity database 110 may store security data characterizing inter-process operations associated with security problems. Such security data may include data identifying the target process (e.g., the path of the target process, an MD5 hash value for the target process, the user context of the target process, etc.), data indicating the access permissions requested by the source process (e.g., a permissions bitmask), data identifying the type of inter-process operation performed (or requested) by the source process, data characterizing the relationship between the source process and the target process (e.g., a parent-child relationship between a source/parent process and a target/child process spawned by the source/parent process), etc.

There may be an association between the existence of a security problem and the act of a parent process spawning a child process, depending, for example, on attributes of the parent and child processes. Parent applications/processes often spawn benign "helper" applications/processes to perform particular tasks or functions. For example, web browsers may spawn plug-ins to display certain types of content (e.g., streaming video, the contents of PDF documents, etc.), and email clients may spawn other applications (e.g., image viewers, PDF readers, media players, etc.) to process email attachments. On the other hand, the spawning of a child process can be an indication of malicious activity. For example, aside from file managers, system processes (e.g., kernel processes or other operating system processes) generally do not spawn user applications (e.g., web browsers, email clients, word processing applications, spreadsheet applications, etc.). Thus, the spawning of a user-level process by a system-level process can be a key indicator of suspicious activity (e.g., a compromised application executing malicious code, an intruder attempting to evade detection by using system-level processes to mask malicious activity, etc.).

In addition or in the alternative, there may be an association between the existence of a security problem and the relationship of a process P to its parent process Pp and its child processes Pc. For example, a benign parent process Pp may spawn a process P that is vulnerable to a security breach. In such cases, the number, identities, and/or activities of child processes Pc spawned by the process P may be indicative of a security problem.

(5) Communicating with a Remote Device or Domain over a Network.

There may be an association between the existence of a security problem and the act of communicating with a particular remote device or domain over a network. The suspicious activity database 110 may store security data characterizing network communications associated with security problems. Such security data may include data representing addresses (e.g., IP addresses, MAC addresses, etc.) of devices or domains, data representing ports through which network communications are sent and/or received, data representing types of network communication (e.g., sending, receiving, or sending and receiving), data representing network protocols used for communication (e.g., TCP, IP, TCP/IP, UDP, ICMP, SSH, FTP, SMTP, HTTP, HTTPS, POP, SFTP, SSL, TLS, PPP, IMAP, WiFi, Bluetooth, etc.), etc.

In some embodiments, the strength of the association (e.g., correlation) between each type or pattern of activity identified in the suspicious activity database 110 and the corresponding security problem may exceed a threshold strength. In some embodiments, the suspicious activity database 110 also stores data indicating or classifying the strength of the association (e.g., correlation) between each type or pattern of activity and the existence of a security problem, data identifying the type of security problem(s) associated with each type or pattern of activity, etc.

The data contained in the suspicious activity database 110 may be provided by a trusted source (e.g., a cybersecurity provider) and/or obtained using any other suitable technique. In some embodiments, the incident detection engine's software components (e.g., behavioral baselining module 150 and/or incident detection module 160) may query the suspicious activity database 110 to determine whether a particular type or pattern of activity observed in a computer system is suspicious. In some embodiments, the data contained in the suspicious activity database 110 may include data (e.g., rules) identifying patterns of activity associated with potential security problems. As described above, a pattern of activity may include a particular type of pattern (e.g., temporal, quantitative, etc.) of occurrences involving (1) a particular user, group of users, or type of user, (2) a particular resource, group of resources, or type of resource, and/or (3) a particular device, group of devices, or type of device. One of ordinary skill in the art will appreciate that defining suspicious activity in terms of patterns of activity involving specified types and groups of users, resources, and devices, is an elegant and efficient technique for establishing general security rules that are broadly applicable to a wide variety of computer systems.

Referring again to FIG. 1, the activity monitoring module 140 may monitor activity on a computer system and store data indicative of observed activity (e.g., observed occurrences, observed patterns of activity, etc.) in the observed activity database 120. In some embodiments, the activity monitoring module 140 filters the observed activity such that the data stored in the observed activity database 120 represents only a subset of the activity observed by the activity monitoring module 140. For example, the activity monitoring module 140 may store data indicative of observed activity in the observed activity database 120 only if the suspicious activity database 110 indicates that activity of the observed type is relevant (or potentially relevant) to computer security.

In some embodiments, the observed activity data may include occurrence records corresponding to observed occurrences. The occurrence record for an observed occurrence may include type data indicating the type of occurrence (e.g., loading a module, performing a file operation, performing a registry operation, performing an inter-process operation, communicating with a remote device or domain, etc.), timing data indicating the timing of the occurrence (e.g., the date/time when the occurrence was observed, the time interval between the observed occurrence and another occurrence, etc.), user data identifying the user or group of user(s) who initiated or were otherwise associated with the occurrence, etc.

In some embodiments, the record for an observed occurrence also includes detailed data that are particular to the type of occurrence. For example, for an occurrence of the "module loading" type, the detailed data may include the type of module loaded, the path to the loaded module, data identifying the loaded module, etc. For an occurrence of the "file operation" type, the detailed data may include the type of file operation performed, the path to a file on which the file operation was performed, data identifying the file on which the file operation was performed, data identifying the process that initiated the file operation, etc. For an occurrence of the "registry operation" type, the detailed data may include the type of registry operation performed, the path to the registry key on which the registry operation was performed, data identifying the registry key on which the registry operation was performed, the value of the registry key before and/or after the registry operation was performed, data identifying the process that performed the registry operation, etc. For an occurrence of the "inter-process operation" type, the detailed data may include the type of inter-process operation performed, data identifying the source process that initiated the inter-process operation, data identifying the target process of the inter-process operation, the user context of the target process, etc. For an occurrence of the "remote communication" type, the detailed data may include types of remote communications observed, addresses of devices or domains to and/or from which remote communications were sent and/or received, ports through which remote communications were sent and/or received, network protocols used for remote communication, etc.

Referring again to FIG. 1, the behavioral baselining module 150 may identify behavioral baselines (e.g., expected patterns of activity) associated with a computer system and store data indicative of those behavioral baselines in the behavioral baseline database 130. In some cases, the data stored in the behavioral baseline database 130 may be indicative of expected patterns of suspicious types of activity, for example, patterns of activity that are generally considered to be suspicious (as defined by data in the suspicious activity database 110), but which are expected on a particular computer system. In this way, the data in the behavioral baseline database 130 may customize the incident detection engine 100 by defining exceptions to general definitions of suspicious behavior embodied by the data in the suspicious activity database 110. For example, if the suspicious activity database 110 indicates that a particular group of workstations are executive workstations and that any access to developer workstations by office workers is suspicious, the behavioral baseline database 130 may identify exceptions to this general rule (e.g., the behavioral baseline database 130 may indicate that a particular office worker X accessing the executive workstation Y of a particular executive Z is expected). As another example, if the suspicious activity database 110 indicates that executing a web browser plug-in is a suspicious type of activity, the behavioral baseline data may include data indicating that a particular user is expected to run a particular plug-in.

In some cases, the data stored in the behavioral baseline database 130 may be indicative of expected patterns of certain activities wherein deviation from the expected pattern of activity is suspicious—even if the type of activity itself is not suspicious. For example, the behavioral baseline data may include data indicating that a particular user is expected to run a particular set of applications, and the user's execution of an application outside the indicated set of applications may therefore be treated as a suspicious activity. As another example, the behavioral baseline data may include data indicating that a particular user is expected to log into a certain number of remote systems per day, and a higher-than-expected number of remote logins by the user in a given day may therefore be treated as suspicious activity. As another example, the behavioral baseline data may include data indicating an expected rate of access R1 to a particular system resource (e.g., a secure database), and a higher actual rate of access R2 to the system resource may therefore be treated as suspicious activity.

In some embodiments, the record of an expected pattern of activity in the behavioral baseline database 130 may include, without limitation, data representing the type of pattern (e.g., temporal, sequential, etc.), the type of activity (e.g., loading a particular module or type of module, performing a particular file operation or type of file operation, performing a particular registry operation or type of registry operation, performing an inter-process operation, communicating with a remote device or domain over a network, etc.) to which the pattern pertains, the user or group of users expected to engage in the pattern of activity, the computer system resource(s) upon which or with which the pattern of activity is expected to be performed, and/or the pattern value (e.g., the rate at which the indicated type of activity is performed, the frequency with which the indicated type of activity is performed, etc.). For example, the record of an expected pattern of suspicious activity may include data representing a particular pattern of activity involving (1) a particular user or set of users (e.g., type of user, group of users, etc.), (2) a particular resource or set of resources (e.g., type of resource, group of resources, etc.), and/or (3) a particular device or set of devices (e.g., type of device, group of devices, etc.).

Figure 2:
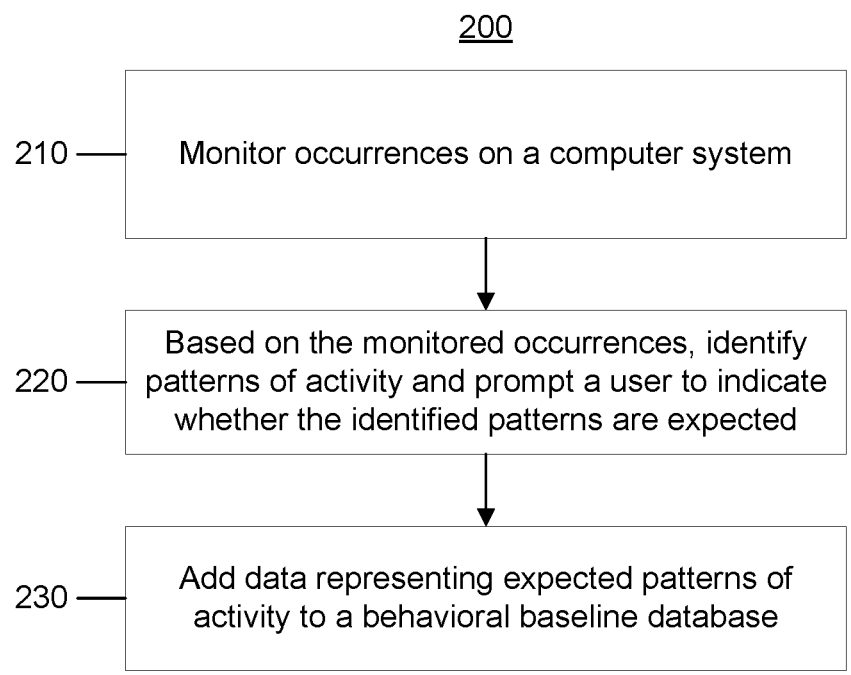
FIG. 2 is a flowchart of a method for determining expected patterns of activity in a computer system, according to some embodiments.

The behavioral baselining module 150 may use any suitable techniques to determine the expected patterns of activity for a user/set of users, resource/set of resources, and/or device (e.g., computer system)/set of devices. FIG. 2 shows an example of a method 200 for determining expected patterns of activity. In some embodiments, the method 200 for determining expected patterns of activity includes monitoring (step 210) occurrences on a computer system, wherein the monitored types of occurrences and/or changes in the patterns of the monitored types of occurrences are suspicious, identifying (step 220) patterns of activity based on the monitored occurrences and prompting a user to indicate whether the identified patterns are expected, and adding (step 230) data representing expected patterns of activity to a behavioral baseline database. Some embodiments of the steps of the method 200 are described in further detail below.

In step 210, occurrences in a computer system are monitored. Any suitable techniques for monitoring occurrences in a computer system may be used. In some embodiments, monitoring occurrences in a computer system includes obtaining occurrence data indicative of occurrences observed in the computer system. In some embodiments, particular types of occurrences are monitored. For example, the monitored types of occurrences may include (1) types of occurrences that the suspicious activity database 110 identifies as being relevant to computer security (e.g., types of occurrences that are included in suspicious patterns of activity identified by data in a suspicious activity database 110) and/or (2) types of occurrences for which the suspicious activity database 110 identifies changes in patterns of the occurrences as being relevant to computer security. Some examples of monitored types of occurrences may include loading a module, performing a file operation, performing a registry operation, performing an inter-process operation, communicating with a remote device or domain, etc.

In step 220, patterns of activity in the computer system (e.g., patterns of activity relevant to the security of the computer system) are identified based on the monitored occurrences. The identified patterns of activity may include rates at which particular users or groups of users perform particular types of activities (e.g., loading particular modules, performing file operations, performing registry operations, performing inter-process operations, communicating with particular remote devices or domains, etc.). Additionally or in the alternative, the identified patterns of activity may include rates at which particular resources (e.g., servers, databases, files, communication ports, power supplies, etc.) of the computer system are accessed. Any suitable type of pattern of activity may be identified, including (but not limited to) the types of patterns of activity described above.

In step 220, a user (e.g., a human user) of the incident detection engine 100 may be prompted to indicate whether the identified patterns of activity are expected. For example, if an identified pattern of activity indicates that a particular user of the computer system executes two particular web browser plug-ins per day, the user of the incident detection engine may be prompted to indicate (1) whether the user of the computer system is expected to execute at least two plug-ins per day, and/or (2) whether the user of the computer system is expected to execute the particular plug-ins indicated by the identified pattern. If the user of the incident detection engine indicates that an identified pattern of activity is expected, data representing the pattern of activity are added to the behavioral baseline database 130 in step 230. Some examples of data representing patterns of activity in the behavioral baseline database 130 are described above.

An identified pattern of activity may relate to activity having one or more particular attributes. In some embodiments of step 220, the user may be prompted to indicate whether additional activity having the same attributes is expected. For example, if an identified pattern of activity indicates that a particular user of the computer system executes two particular web browser plug-ins per day, the user of the incident detection engine may be prompted to (1) indicate the actual number of plug-ins the user of the computer system is expected to execute per day, and/or (2) identify any plug-ins that are not indicated by the pattern but that the user is expected to execute.

Although not shown in FIG. 2, if the user indicates that an identified pattern of activity is not expected, the incident detection engine may issue a security alert related to the unexpected pattern of activity. Additionally or in the alternative, the user may be prompted to identify one or more expected patterns of activity having the same attributes as the unexpected pattern of activity. For example, if an identified pattern of activity indicates that a particular user of the computer system executes two particular web browser plug-ins per day, and the user of the incident detection system indicates that this pattern of activity is not expected, the incident detection engine may issue a security alert related to the computer system user's execution of the two plug-ins, and may prompt the user of the incident detection system to identify any plug-ins that the computer system user is expected to execute.

Referring again to FIG. 1, some embodiments of the behavioral baselining module 150 can use the behavioral baseline database 130 to determine whether a particular pattern of activity in a computer system is expected or unexpected. In some embodiments, when presented with data representing a particular pattern of activity, the behavioral baselining module 150 may identify one or more attributes of the pattern and/or of the activity to which the pattern relates and query the behavioral baseline database 130 to identify any expected patterns of activity having the same attributes as the particular pattern of activity. If no expected patterns of activity having the attributes of interest are identified, the baselining module 150 may determine that the particular pattern of activity is unexpected.

For example, when presented with data indicating a pattern of activity characterized by a user U1 accessing a secure server S1 five times per day, the baselining module 150 may identify the attributes of the pattern. In this case, the identified attributes of the pattern may include (1) the pattern's type (temporal), (2) the type of activity to which the pattern relates (remote communications), (3) the user who initiated the activity (user U1), and (4) the resource used to perform the activity (server S1). The baselining module may query the baseline database 130 to identify any expected temporal patterns of activity relating to remote access of the server S1 and/or relating to remote access of secure servers by the user U1. If the baseline database 130 does not return any expected patterns of activity matching those criteria, the baselining module 150 may determine that user U1's activity (logging on to the server S1 five times in a day) is unexpected.

On the other hand, if one or more expected patterns of activity having the attributes of interest are identified, the baselining module 150 may compare the pattern of activity in question to the expected pattern(s) of activity identified by the baseline database 130 to determine whether the activity in question is expected or unexpected. In some embodiments, if the pattern of activity in question matches at least one of the corresponding expected patterns of activity, the baselining module 150 determines that the pattern of activity in question is expected; otherwise, the baselining module 150 determines that the pattern of activity in question is unexpected. In some embodiments, the pattern of activity in question matches a corresponding expected pattern of activity if a difference (e.g., arithmetic difference, percentage difference, etc.) between the pattern in question and the expected pattern is less than a specified difference.

For example, when presented with data indicating a pattern of activity characterized by a user U1 accessing a secure server S1 five times per day, the baselining module 150 may query the baseline database 130 to identify any expected temporal patterns of activity relating to remote access of the server S1 and/or relating to remote access of secure servers by the user U1, and the baseline database 130 may return an expected pattern of activity indicating that the user U1 is expected to access the secure server S1 up to seven times per time day. Since that pattern of activity in question matches the expected pattern of activity, the baseline module 150 may determine that the pattern of activity in question is expected.

Figure 3:
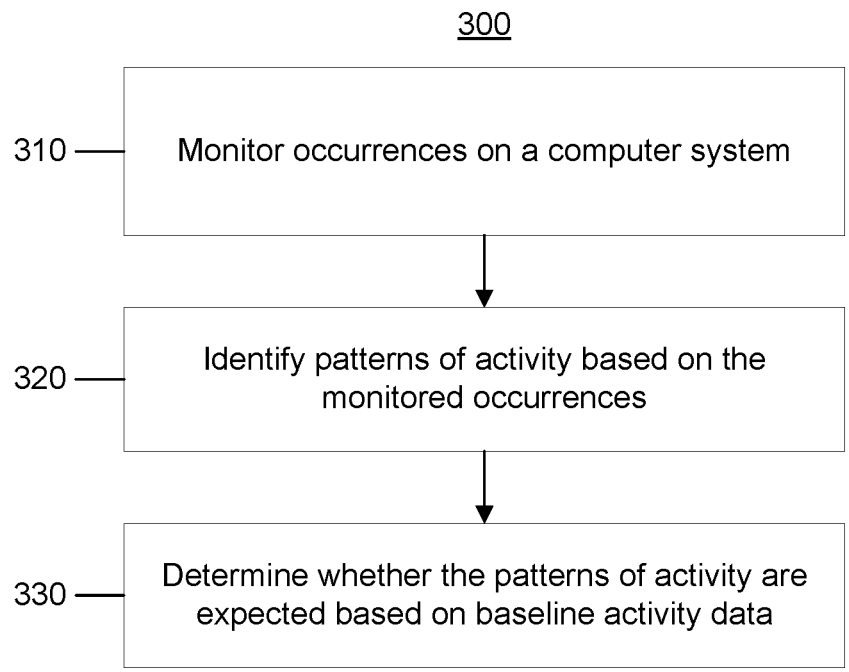
FIG. 3 is a flowchart of a method for detecting cybersecurity incidents based on differences between actual and expected patterns of activity in a computer system, in accordance with some embodiments.

Referring again to FIG. 1, the incident detection engine 100 may include an incident detection module 160. In some embodiments, the incident detection module 160 monitors activity on the computer system and, in response to detecting differences between actual and expected patterns of certain types of activity (e.g., activity associated with potential security risks), initiates an incident response. The incident detection module 160 may use any suitable techniques to detect differences between actual and expected patterns of activity. FIG. 3 shows an example of a method 300 for detecting differences between actual and expected patterns of activity. In some embodiments, the method 300 includes monitoring (step 310) occurrences on a computer system, wherein the monitored types of occurrences and/or changes in the patterns of the monitored types of occurrences are suspicious, identifying (step 320) patterns of activity based on the monitored occurrences, and determining (step 330) whether the patterns of activity are expected based on baseline activity data. Some embodiments of the steps of the method 300 are described in further detail below.

In step 310, occurrences in a computer system are monitored. Some techniques for monitoring occurrences (e.g., occurrences associated with potential security risks) in a computer system are described above, with reference to step 210 of the method 200 of FIG. 2.

In step 320, patterns of activity in the computer system (e.g., patterns of activity relevant to the security of the computer system) are identified based on the monitored occurrences. Some techniques for identifying patterns of activity based on monitored occurrences are described above, with reference to step 220 of the method 200 of FIG. 2.

In step 330, the incident detection module 160 determines whether the identified patterns of activity are expected based on baseline activity data (e.g., based on the behavioral baseline data stored in the behavioral baseline database 130). In some embodiments, the incident detection module 160 determines whether a pattern of activity is expected by sending a suitable query to the behavioral baselining module 150, wherein the query includes data representing the pattern of activity. Using techniques described above, the behavioral baselining module can evaluate the pattern of activity and send a response to the incident detection module's query indicating whether the pattern of activity is expected or unexpected. If the pattern of activity is unexpected, the incident detection module 160 may issue a security alert related to the pattern of activity. Otherwise, the incident detection module 160 may refrain from issuing a security alert.

In some embodiments, the baselining module 150 identifies expected patterns of activity in a computer system (e.g., using the method 200) during a training period, and the incident detection engine 160 detects cybersecurity incidents based on differences between actual and expected patterns of activity (e.g., using the method 300) during a subsequent detection period. In some embodiments, the incident detection engine 100 alternates between training periods and detection periods periodically or at suitable times. In some embodiments, the incident engine 100 performs training periods and detection periods at least partially in parallel, such that the incident detection engine 100 simultaneously (1) identifies new expected patterns of activity (or updates existing expected patterns of activity) and (2) detects cybersecurity incidents based on differences between actual patterns of activity and expected patterns of activity that have already been identified.

One of ordinary skill in the art will appreciate that defining suspicious activity in terms of patterns of activity involving specified users/sets of users, resources/sets of resources, and/or devices/sets of devices, is an elegant and efficient technique for establishing general security rules that are broadly applicable to a wide variety of computer systems. One of ordinary skill in the art will further appreciate that the techniques described herein can be used to efficiently customize an incident detection engine 100 to accommodate the peculiarities of different computer systems by identifying system-specific exceptions to such generally suspicious patterns of activity.

Further Description of Some Embodiments

Some embodiments of the methods and operations described in the present disclosure can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Some embodiments of the methods and operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, for example web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Some embodiments of the processes and logic flows described in this specification can be performed by one or more programmable processors executing one or more computer programs to perform actions by operating on input data and generating output. Some embodiments of the processes and logic flows described herein can be performed by, and some embodiments of the apparatus described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both.

Figure 4:
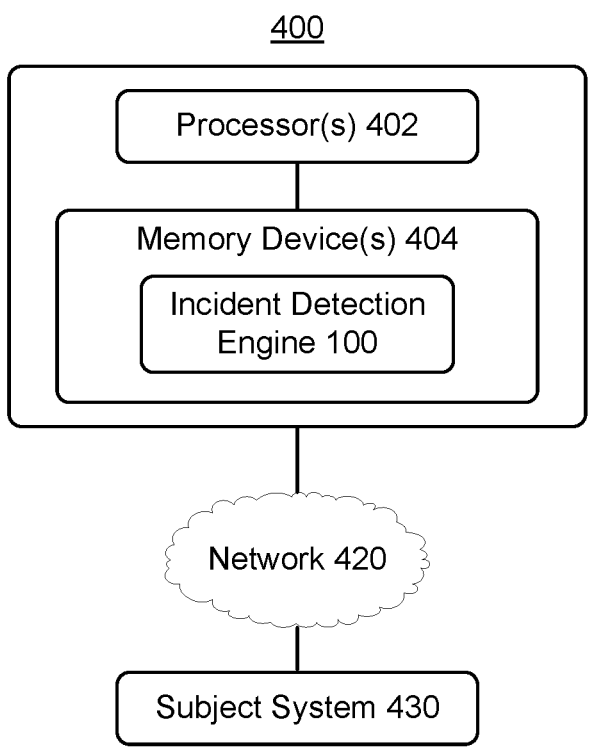
FIG. 4 is a block diagram of a computer system, in accordance with some embodiments.

FIG. 4 shows a block diagram of a computer 400. The computer 400 includes one or more processors 402 for performing actions in accordance with instructions and one or more memory devices 404 for storing instructions and data. In some embodiments, the computer 400 implements an incident detection engine 100. The incident detection engine 100 may perform a method 200 for determining expected patterns of activity in a computer system and/or a method 300 for detecting security incidents based on differences between actual and expected patterns of activity in a computer system. Different versions of the incident detection engine 100 may be stored, distributed, or installed. Some versions of the software may implement only some embodiments of the methods described herein. The software components 140-160 can include subcomponents that can execute on the same or different individual data processing apparatus. The databases 110-130 can reside in one or more physical storage systems and can be implemented, for example, as relational databases, flat files, object-oriented databases, or combinations thereof.

Generally, a computer 400 will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Some embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations may be described in this disclosure or depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented cybersecurity method, comprising:
    obtaining first occurrence data indicative of a plurality of first occurrences observed in a computer system;
    identifying, based on the first occurrence data, a plurality of first patterns of activity in the computer system;
    identifying attributes for each of the identified plurality of first patterns of activity, the identified attributes comprising a user identifier of a user initiating an activity and one or more of the following: a type for a pattern of the activity, a type of the activity, and one or more resources used to perform the activity;
    based on the identified attributes, classifying each of the plurality of first patterns of activity as expected;
    based on the classifying, adding data representing the plurality of first patterns of activity to data in a behavioral baseline database;
    obtaining second occurrence data indicative of a plurality of second occurrences observed in the computer system;
    identifying, based on the second occurrence data, at least one second pattern of activity in the computer system;
    comparing the at least one second pattern of activity to the data in the behavioral baseline database, said comparing comprising:
        identifying one or more attributes of the at least one second pattern of activity; and
        querying the behavioral baseline database to identify one or more first patterns of activity having same attributes as the at least one second pattern of activity;
    based on the comparing, determining an association between the at least one second pattern of activity and the data in the behavioral baseline database is above a threshold and identifying the second pattern of activity as unexpected; and
    based on identifying the second pattern of activity as unexpected, issuing a security alert related to the second pattern of activity.

2. The method of claim 1, wherein the first occurrence data is obtained based on security data indicating that the plurality of first occurrences are relevant to computer security and/or that changes in patterns of the plurality of first occurrences are relevant to security, and wherein the second occurrence data is obtained based on security data indicating that the plurality of second occurrences are relevant to computer security and/or that changes in patterns of the plurality of second occurrences are relevant to computer security.

3. The method of claim 1, wherein the first occurrence data is obtained based on security data indicating that the plurality of first occurrences include one or more suspicious patterns of activity.

4. The method of claim 1, wherein the second occurrence data is obtained based on security data indicating that the plurality of second occurrences include one or more suspicious patterns of activity.

5. The method of claim 1, wherein identifying the plurality of first patterns of activity comprises identifying a set of one or more occurrences involving (1) a particular set of one or more users, (2) a particular set of one or more resources, and/or (3) a particular set of one or more devices.

6. The method of claim 5, wherein the particular set of one or more users comprises a particular user, a plurality of specified users, or users of a specified type.

7. The method of claim 5, wherein the particular set of one or more resources comprises a particular resource, a plurality of specified resources, or resources of a specified type.

8. The method of claim 5, wherein the particular set of one or more devices comprises a particular device, a plurality of specified devices, or devices of a specified type.

9. The method of claim 5, wherein the set of one or more occurrences comprise an occurrence comprising: module-loading operations, file operations, registry operations, inter-process operations, and/or inter-device communication operations.

10. The method of claim 5, wherein the plurality of first patterns of activity include a temporal pattern of activity and/or a quantitative pattern of activity.

11. The method of claim 10, wherein identifying the temporal pattern of activity comprises determining a temporal rate of one or more occurrences in the identified set of one or more occurrences.

12. The method of claim 10, wherein identifying the quantitative pattern of activity comprises determining a number of occurrences in the identified set of one or more occurrences.

13. The method of claim 12, wherein the number of the occurrences in the identified set of one or more occurrences occur in a specified time period.

14. The method of claim 13, wherein the specified time period comprises a fixed time period or a sliding window time period.

15. The method of claim 1, wherein classifying each of the plurality of first patterns of activity as expected comprises:
    prompting the user to indicate whether a respective pattern of activity from the plurality of first patterns of activity is expected,
    in response to prompting the user, receiving user input,
    determining, based on the user input, the respective pattern of activity is expected, and
    based on determining the respective pattern of activity is expected, classifying the respective pattern of activity as expected.

16. The method of claim 1, wherein identifying the plurality of first patterns of activity comprises identifying a group's pattern of activity including a rate of a particular occurrence involving members of the group.

17. The method of claim 1, further comprising, for a particular second pattern of activity from the plurality of second occurrences:
    identifying one or more attributes of an activity associated with the particular second pattern of activity;
    prompting the user of the computer system to indicate whether additional activity having the one or more attributes is expected;
    in response to prompting the user, receiving second user input indicating that the additional activity having the one or more attributes is expected;
    generating data representing a corrected pattern of activity based on the particular second pattern of activity and the additional activity; and
    adding data representing the corrected pattern of activity to the behavioral baseline database.

18. The method of claim 1, further comprising:
prompting the user of the computer system to confirm whether the second pattern of activity is expected or not expected,
in response to prompting the user, receiving second user input,
determining, based on the second user input, whether the second pattern of activity is expected, and
if the second user input indicates that the second pattern of activity is expected, adding data representing the second pattern of activity to the behavioral baseline database.

19. A cybersecurity system, comprising:
a data processing apparatus comprising a memory and a processor, the data processing apparatus programmed to perform operations including:
    obtaining first occurrence data indicative of a plurality of first occurrences observed in a computer system;
    identifying, based on the first occurrence data, a plurality of first patterns of activity in the computer system;
    identifying attributes for each of the identified plurality of first patterns of activity, the identified attributes comprising a user identifier of a user initiating an activity and one or more of the following: a type for a pattern of the activity, a type of the activity, and one or more resources used to perform the activity;
    based on the identified attributes, classifying each of the plurality of first patterns of activity as expected;
    based on the classifying, adding data representing the plurality of first patterns of activity to data in a behavioral baseline database;
    obtaining second occurrence data indicative of a plurality of second occurrences observed in the computer system;
    identifying, based on the second occurrence data, at least one second pattern of activity in the computer system;
    comparing the at least one second pattern of activity to the data in the behavioral baseline database, said comparing comprising:
        identifying one or more attributes of the at least one second pattern of activity; and
        querying the behavioral baseline database to identify one or more first patterns of activity having same attributes as the at least one second pattern of activity;
    based on the comparing, determining an association between the at least one second pattern of activity and the data in the behavioral baseline database is above a threshold and identifying the second pattern of activity as unexpected; and
    based on identifying the second pattern of activity as unexpected, issuing a security alert related to the second pattern of activity.

20. One or more non-transitory computer storage media having computer-executable instructions that, upon execution by a processor, cause the processor perform a cybersecurity method, comprising:
obtaining first occurrence data indicative of a plurality of first occurrences observed in a computer system;
identifying, based on the first occurrence data, a plurality of first patterns of activity in the computer system;
identifying attributes for each of the identified plurality of first patterns of activity, the identified attributes comprising a user identifier of a user initiating an activity and one or more of the following: a type for a pattern of the activity, a type of the activity, and one or more resources used to perform the activity;
based on the identified attributes, classifying each of the plurality of first patterns of activity as expected;
based on the classifying, adding data representing the plurality of first patterns of activity to data in a behavioral baseline database;
obtaining second occurrence data indicative of a plurality of second occurrences observed in the computer system;
identifying, based on the second occurrence data, at least one second pattern of activity in the computer system;
comparing the at least one second pattern of activity to the data in the behavioral baseline database, said comparing comprising:
    identifying one or more attributes of the at least one second pattern of activity; and
    querying the behavioral baseline database to identify one or more first patterns of activity having same attributes as the at least one second pattern of activity;
based on the comparing, determining an association between the at least one second pattern of activity and the data in the behavioral baseline database is above a threshold and identifying the second pattern of activity as unexpected; and
based on identifying the second pattern of activity as unexpected, issuing a security alert related to the second pattern of activity.

21. The cybersecurity system of claim 19, wherein classifying each of the plurality of first patterns of activity as expected comprises:
prompting the user to indicate whether a respective pattern of activity from the plurality of first patterns of activity is expected,
in response to prompting the user, receiving user input,
determining, based on the user input, the respective pattern of activity is expected, and
based on determining the respective pattern of activity is expected, classifying the respective pattern of activity as expected.

22. The cybersecurity system of claim 19, wherein the association between the at least one second pattern of activity and the data in the behavioral baseline database is based on a number of matches between the at least one second pattern of activity and the data in the behavioral baseline database.

* * * * *